US007849281B2

(12) United States Patent
Malhotra et al.

(10) Patent No.: US 7,849,281 B2
(45) Date of Patent: Dec. 7, 2010

(54) METHOD AND SYSTEM FOR IMPLEMENTING HIERARCHICAL PERMISSION MAPS IN A LAYERED VOLUME GRAPH

(75) Inventors: Sumeet Malhotra, Banglaore (IN); Swati Gupta, Somerville, MA (US); Girish B. K. Kumar, Bangalore (IN)

(73) Assignee: EMC Corporation, Hopkinton, MA (US)

(*) Notice: Subject to any disclaimer, the term of this patent is extended or adjusted under 35 U.S.C. 154(b) by 656 days.

(21) Appl. No.: 11/724,030

(22) Filed: Mar. 13, 2007

(65) Prior Publication Data
US 2007/0233985 A1 Oct. 4, 2007

(30) Foreign Application Priority Data
Apr. 3, 2006 (IN) .......................... 298/KOL/2006

(51) Int. Cl.
G06F 12/08 (2006.01)
(52) U.S. Cl. ..................................... 711/163
(58) Field of Classification Search ................. 711/163, 711/147, 6; 710/243; 709/214
See application file for complete search history.

(56) References Cited

U.S. PATENT DOCUMENTS

| 5,999,978 | A * | 12/1999 | Angal et al. ................. 709/229 |
| 2002/0156987 | A1* | 10/2002 | Gajjar et al. ................. 711/203 |
| 2003/0084324 | A1* | 5/2003 | Koved et al. ................. 713/200 |
| 2003/0115327 | A1* | 6/2003 | Kokado et al. ............... 709/225 |
| 2007/0239944 | A1* | 10/2007 | Rupanagunta et al. ....... 711/147 |
| 2007/0283088 | A1* | 12/2007 | Hannigan .................... 711/114 |

OTHER PUBLICATIONS

American National Standard for Information Technology, Fabric Application Interface Standard (FAIS), rev. 0.5, Jul. 2005.*
Rupanagunta, "An Apparatus for Performing Storage Virtualization", Feb. 2006.*
Zhou et al., "Pipelinging Scheduling and Hierarchical-Volume Management in a Storage Area Network", Apr. 2006.*
EMC Corp., "Rationale for Hierarchical XMAPs".*

* cited by examiner

*Primary Examiner*—Brian R Peugh
*Assistant Examiner*—Sam Chen
(74) *Attorney, Agent, or Firm*—Chapin IP Law, LLC

(57) ABSTRACT

The invention is for a method of mapping hierarchical volume permission to top level permissions in a layered volume graph of a virtual data storage system with hierarchy of storage volumes requiring permission at every volume level and the top level volume exposed to the hosts via intelligent switches comprising: applying volume level permissions on a volume of the volume graph and mapping condensed permission hierarchically for the entire volume graph to the top level volume from said individual volume level permission.

32 Claims, 13 Drawing Sheets

METHOD AND SYSTEM FOR IMPLEMENTING HIERARCHICAL PERMISSION MAPS IN A LAYERED VOLUME GRAPH

CROSS REFERENCE TO RELATED APPLICATIONS

The present application claims the priority to India Patent Application No. 298/KOL/2006, filed on Apr. 3, 2006, entitled METHOD AND SYSTEM FOR IMPLEMENTING HIERARCHICAL PERMISSION MAPS IN A LAYERED VOLUME GRAPH, the contents and teachings of which are hereby incorporated by reference in their entirety.

FIELD OF THE INVENTION

The present invention relates to a system having a hierarchy of storage volumes requiring permissions at every volume level, and more particularly to a mechanism of mapping hierarchical volume permissions to top level permissions in a volume graph structure supported by intelligent multi-protocol switches.

BACKGROUND OF THE RELATED ART

Storage virtualization or just "virtualization" is defined as the process of taking many different physical storage networks and devices, and making them appear as one "virtual" entity for purposes of management and administration. The view of the storage device structure may not correspond to the actual physical storage system (hence, "virtual"). Virtualization using intelligent multi-protocol switches separates host commands into Slow Path and Fast Path. Slow Path commands consist of all Non-READ/Non-WRITE Small Computer System Interface ("SCSI") commands in an input-output (IO) stream, viz. INQUIRY, READ CAPACITY, TEST UNIT READY, etc.; whereas all READ/WRITE SCSI commands qualify as Fast Path commands. All Slow Path commands can be faulted back to the Storage Application and appropriate response can be generated. Fast Path commands on the other hand directly go the back-end.

Storage Applications may rely on "volumes" of data. These are "logical volumes" or "logical objects". In order for many Storage Applications to work in tandem (e.g. Mirroring a Snapshot), volumes must be organized as a hierarchical graph structure where each Storage Application "owns" a layer in the graph. Since each Storage Application should be able to work independently of each other, every Storage Applications can apply individual permissions on the volumes it owns.

In Switch based virtualization, the permissions applied on various volume levels, need to be applied at the switch ports where IOs can either be faulted or let through based on the permissions. Switch vendors provide an application programming interface (API) to allow storage applications to set permissions, whereby Storage Applications put volume permissions to control the behavior of Fast Path commands. The permissions determine whether Fast Path IO will get faulted back to the Storage Application, will be held at the switch port or will be allowed. Examples of Storage Applications can be Clones, Data Mobility, Snapshot, etc.

Storage area network (SAN) with controlled access to the hosts connected to the network is well known in the art. "Host computers" can be any type of computers, for application processing, operating systems and data management applications. The host computers may be connected over a network. This network may include switching nodes, although any other form of network may be used. There are number of granted patents in the field that discloses methods for storage virtualization, access control, handling of overlapping requests and mapping of permission for different hosts in the control memory block. Some of these prior art patents in the field are briefly described below.

U.S. Pat. No. 6,993,589 discloses a method and apparatus for providing secure access to a computer system resource. The computer system includes a plurality of logical volumes of data that are visible to a host computer and a storage system. In accordance with one aspect of the invention, a request, from a requester having less than system administrator access privileges, to perform an action directly on the one of the plurality of raw storage devices is granted, so that a logical channel is provided for the direct access without the said logical channel being mapped by a file system/LVM mapping layer contained in the host computer. According to another aspect, a plurality of volumes of storage are visible to the application layer, and access privileges less than the root access privileges are assigned to the at least one application program to access the plurality of volumes of storage.

Another approach for managing access to a plurality of storage resources in a computer system has been described in U.S. Pat. No. 6,993,581. In one aspect, requests to access one of the plurality of storage resources from the application layer are intercepted, and at least one of the interests is modified in a manner that will impact the access facility in determining whether the requestor satisfies the privilege level to be granted access to the one of the plurality of storage resources.

Yet another approach has been taken in the US 2004 0098424 A1, wherein metadata that relates logical block addresses of data used by a file system with the physical block addresses at which the data is stored is maintained in nodes that are arranged into a hierarchical volume map tree that extends from a root node to a plurality of leaf nodes. A method and apparatus is described for efficiently copying distributed data files. A copy of the volume map tree root node is maintained in a covolume and the modifications to that volume map tree copy is maintained as a new covolume by creating a new delta.

U.S. Pat. No. 6,535,891 discloses a technique for identifying accesses to a repository of logical objects stored on a storage system based upon information identifying accesses to physical storage locations. The repository is mapped from application space to physical space to create mapping information identifying which units of storage in physical space store the repository, and the mapping information is made visible to the application space. An incremental operation is executed on the repository of logical objects. A further aspect is directed to a storage system that identifies to the host accesses to a repository of logical objects based upon accesses to corresponding units of storage in physical space.

Further, a technique for host volume mapping for shared storage volumes in a multi-host computing environment has been disclosed in WIPO Publication No. WO 01/20470 A1. The method for controlling access to a shared storage device includes the steps of associating a locally unique identifier with each of the plurality of computers, defining a data structure in a memory identifying which particular ones of the computers based on the locally unique identifier may be granted access to the device; and querying the data structure to determine if a requesting one of the computers should be granted access to the device.

Furthermore, U.S. Pat. No. 6,842,843 discloses a digital data storage subsystem including arrangement for increasing cache memory addressability. A memory access request receiver module of a memory manager is configured to receive an access request requesting an access operation in connection with the memory, the access request including an address. A memory access operation control module of a memory manager is configured to perform an access operation in connection with the memory using an absolute address generated by an address translation module. The address in an access request includes a segment identifier and an offset, the address translation module being configured to process the segment identifier and offset to generate an absolute address identifying at least one storage location.

Another approach for storage mapping and partitioning among multiple host processors has been described in U.S. Pat. No. 6,799,255. A storage controller for controlling access to data storage has a memory and at least one data port for a data network including host processors. When the storage controller receives a data access request from a host processor, it decodes a host identifier from the data access request, and searches the memory for a host identifier matching the host identifier decoded from the request. Upon finding a match, the respective specification of the respective subset for the host processor is accessed to determine whether or not storage specified by the storage access request is contained in the respective subset. If so, then storage access can continue, and otherwise, storage access is denied.

However, current limitation in switch implementation is that they do not support hierarchical volume permissions, that is, the multi-protocol intelligent switches do not support permissions which are applied at various individual volume levels in a volume graph. On the contrary, they require the permissions to be applied only at the top level volume of the graph which is exposed to the host via the intelligent port. Therefore, the challenge is to create a mapping mechanism which can convert permissions at an individual volume level to be translated and applied at the top level. This kind of layered permissions is called a hierarchical permission map. Thus, in order to make hierarchical Storage Applications, e.g. data mobility or a cloned volume, there is a need for a mechanism to map hierarchical permissions to top level permissions, supported by the switches. The present invention aims to solve this technical problem for a storage area network (SAN).

SUMMARY OF THE INVENTION

The invention deals with development of an algorithm to allow maintenance of hierarchical permission maps and the ability to condense the permissions by "ORing" the permissions hierarchically, into a combined, condensed and cumulative permission map, which can be applied on the switches at the top level volume. The invention also allows for maintaining the hierarchical permission semantics and at the same time, applying cumulative permissions on the switch. Apart from these to and fro mappings, said algorithm provides condensation of the permission map by reducing redundancy and merging adjacent regions having same permissions.

Accordingly, the present invention provides a method of mapping hierarchical volume permissions to top level volume permissions in a layered volume graph structure of a virtualized data storage system having a hierarchy of storage volumes requiring permissions (or access control) at every volume level, wherein said top level volume is exposed to the host via intelligent multi-protocol switch(es), said method comprising the steps of applying volume permissions on a volume within said volume graph structure; and mapping condensed permissions hierarchically for the said entire volume graph structure to the top level volume from said individual volume permission.

The present invention also provides a system for implementing hierarchical permission maps in a layered volume graph structure of a virtualized data storage volume having a hierarchy of storage volumes requiring permissions (or access control) at every volume level, said system comprising:

Intelligent multi-protocol switch(es) between host server(s) and virtualized data storage volume, said switch(es) being adapted to read the hierarchical volume permission set at the top most level of said volume graph structure;

means for storage virtualization;

means for applying volume permissions on a volume within said volume graph structure and means for condensing permissions from the individual volume levels to the top most volume level of said volume graph structure hierarchically for the entire volume graph structure for access control through said intelligent switch(es).

The present invention further provides a storage area network connected to a plurality of host computers, wherein the storage is a virtual storage with a hierarchical volume structure and the storage application is adapted to set permission for individual volumes in the volume graph and also map the hierarchical top level volume permission by condensing, combining and accumulating individual volume level permissions to the top level volume in the hierarchy comprising:

at least one physical storage device configured to virtual storage volumes with a hierarchical structure;

a plurality of host computers connected to the virtual storage volumes through multi-protocol intelligent switch(es);

a controller device, being a generic computing device that runs the applications for storage virtualization, for applying individual volume level permissions and for mapping the hierarchical permissions to the top most level of the volume graph by combining, condensing and accumulating the individual volume level permissions to the top most level, wherein said application for mapping the top most level hierarchical permission initially sets ALLOW permission as the default permission for the entire region of the top most level volume in the hierarchy and then rolls up the individual volume level permissions to the top level volume whenever interrupted by a negative or hold permission in the corresponding region of next or subsequent child volume in the hierarchy;

a communication channel between the host computer(s) and virtual volumes through said intelligent switch(es) wherein all I/Os from the hosts are broken into fast path or slow path and depending on the volume permission as read by the switch from the mapped top level hierarchical permission the fast path I/O is faulted back to the storage application or allowed access to the respective physical storage as per the mapping module while generating appropriate message for the host when the access is denied or kept on hold and a table comprising the permission map with rolled up permission of all individual volume level permission to the top most level of the hierarchical volume graph, wherein said table is embedded in a memory of said controller device to allow, hold or deny access to the host requesting the permission.

The present invention further provides a computer-operable program implementing the inventive method. In this connection, there is provided a computer program product comprising a computer readable storage medium having a computer program embedded therein, said program being adapted to map the volume level permission at the individual volumes to top level volume permission in a hierarchical volume graph of a virtual storage by rolling up the respective volume level permission to the top most level of the hierarchical volume graph, wherein the permission applied to a corresponding region of a parent volume always gets precedence over the permission applied on the same region of child in the hierarchy.

The present invention provides these and other advantages as will be apparent to those having ordinary skill in the art upon reading of the following detailed description of the invention with reference to the accompanying drawings as briefly described below.

DETAILED DESCRIPTION OF THE INVENTION

Figure 1:
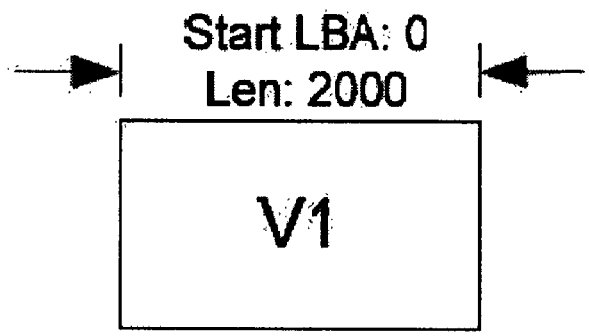
FIG. 1 shows a logical volume.

For purposes of the specification and claims, a "volume", as illustrated in FIG. 1, also called a Logical Unit (LU), represents a virtual contiguous storage space. It refers to a logical entity and may map to a physical disk or another volume, that is, it generally corresponds to a logical abstraction of physical storage. Regions in a volume are addressed by using the logical block address (LBA). LBA for a volume starts from 0 and ends at the maximum capacity of the volume. Volumes can be stacked and layered above one another forming a hierarchical graph structure. The top level root volume of the graph represents the entire graph range. Typically, IOs flow from top level root volume down the graph and take various paths depending on the IO range (offset, length).

Figure 2A:
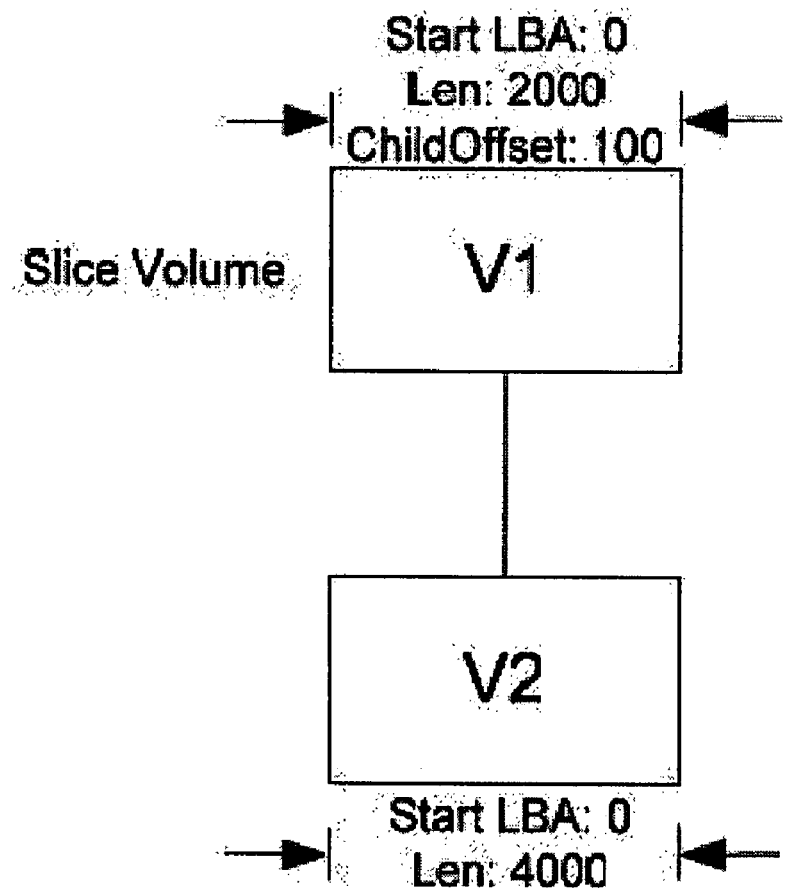
FIGS. 2a, 2b and 2c show exemplary diagrams of various types of volumes, viz. Slice, Concat and Mirror Volumes, respectively.
Figure 2B:
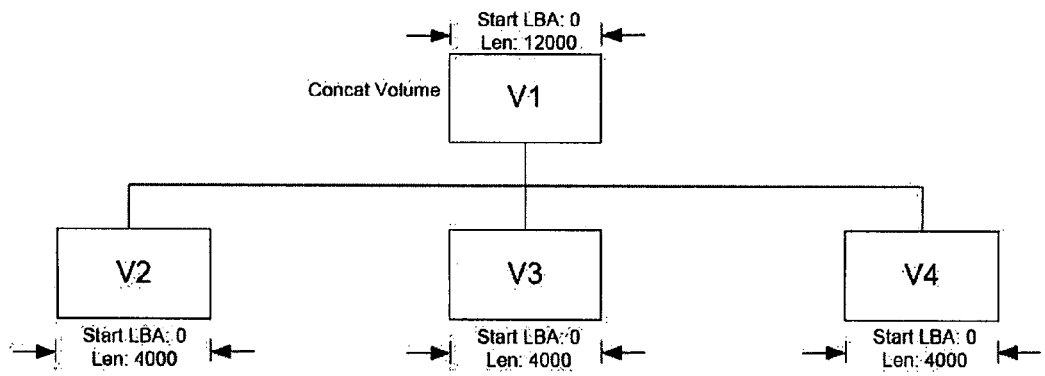
Figure 2C:
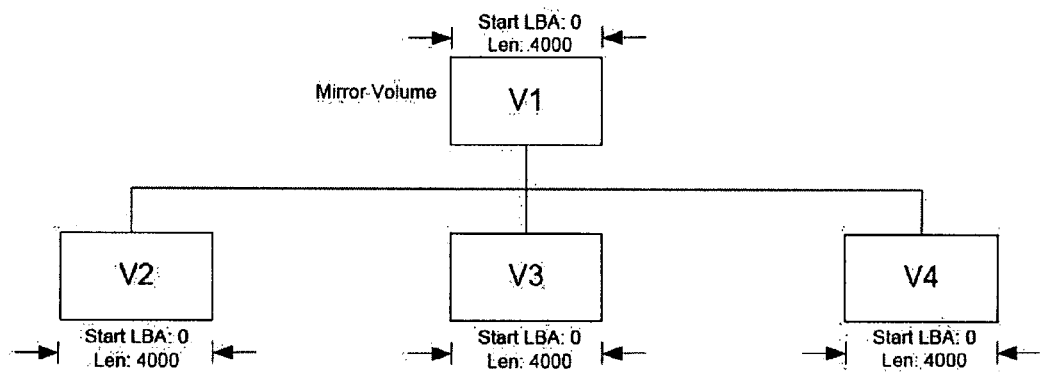

A brief definition of the various terms that are used in the description is given below in order to facilitate understanding of the present invention. The invention is illustrated with reference to the properties of a volume, which include its type, capacity and the permission map it contains. There can be various types of volumes like slice, concat, stripe, simple and mirrored. FIGS. 2a, 2b and 2c give examples of how volumes can be constructed.

Slice Volume

A slice volume, as shown in FIG. 2a, represents a subset of an existing volume on which it is created. Its attributes are the offset into the original child volume (LBA) and its capacity (Length). The length of the Slice Volume V1 in FIG. 2a, is just taken as an example. The Client application which creates the Slice Volume decides on the length.

Concat Volume

A concat volume, as shown in FIG. 2b, represents an aggregate of an existing set of volumes. The capacity of the concat volume is the sum of the capacities of its child volumes. The address space of the new concat volume is a serial join of the address spaces of the child volumes.

Mirror Volume

A mirror volume, as shown in FIG. 2c, represents a volume where every IO is replicated over all its children, i.e. Mirrored. The capacity of the mirror volume is same as each of its child, and all child volumes of a mirror have identical capacities.

Volume Graph

Figure 3:
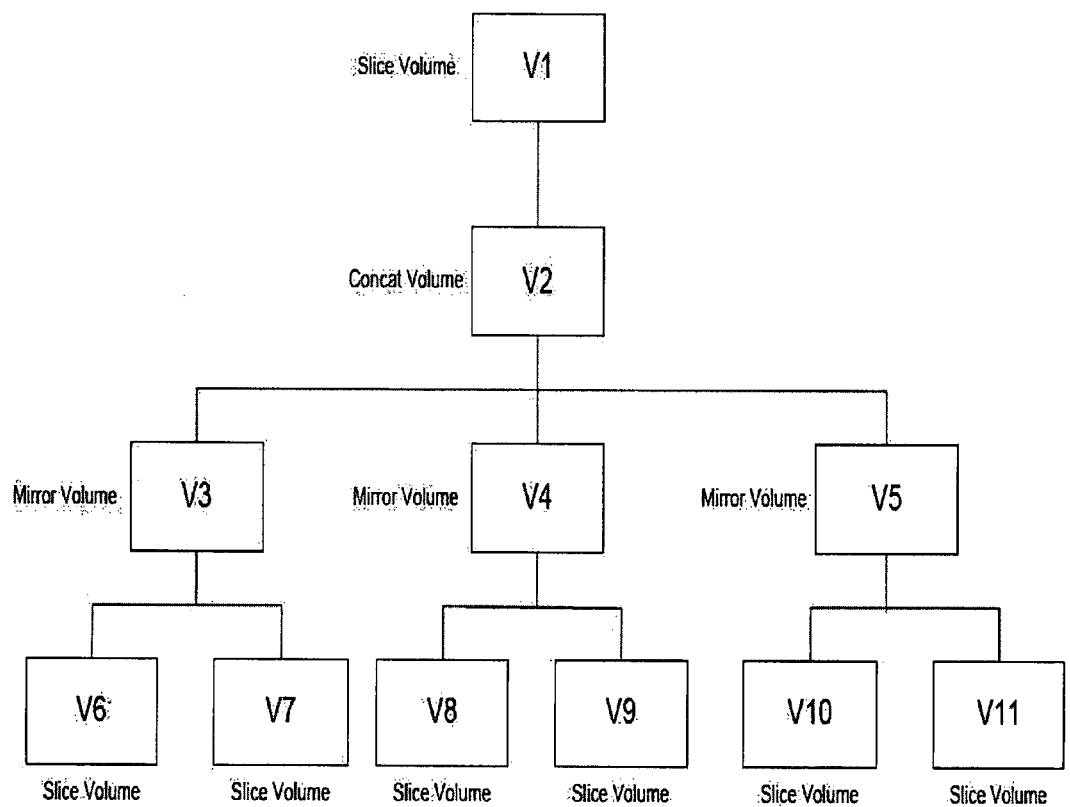
FIG. 3 shows a Hierarchical Volume Graph.

As mentioned hereinbefore, a volume is a logical entity and can be constructed in various ways using other volumes. Similarly, volumes of various types (slice, concat, mirror) can be combined to form a more complex structure called a volume graph. FIG. 3 shows an exemplary layout of volumes configured with a hierarchical architecture. This is called layered Volume Graph, and is also known as Hierarchical Volume Graph. Here a concat volume has been constructed out of three mirror volumes. As can be seen in the diagram, a volume graph can be viewed as a hierarchy of volumes.

Volume Permissions

As IO is done on a volume, it can be thought of being passed top-down through the volume graph. For example if IO is done on volume V1 in FIG. 3, it will pass down the graph via V2 and either V3, V4 or V5, depending on the LBA range on which the IO was done and its mapping in the child volumes. At every volume, certain permissions can be applied which can control the action which ought to be taken in the event of an IO happening on a certain LBA range within that volume.

Permissions can be Either:

FAULT_ON_READ: Any READ IO on the specified range will result in the IO being faulted back to the storage application.

FAULT_ON_WRITE: Any WRITE IO on the specified range will result in the IO being faulted back to the storage application.

ALLOW_IO: Allow both READ and WRITE to proceed on the specified range.

HOLD_IO: Hold all IO until the permission is changed.

Figure 4:
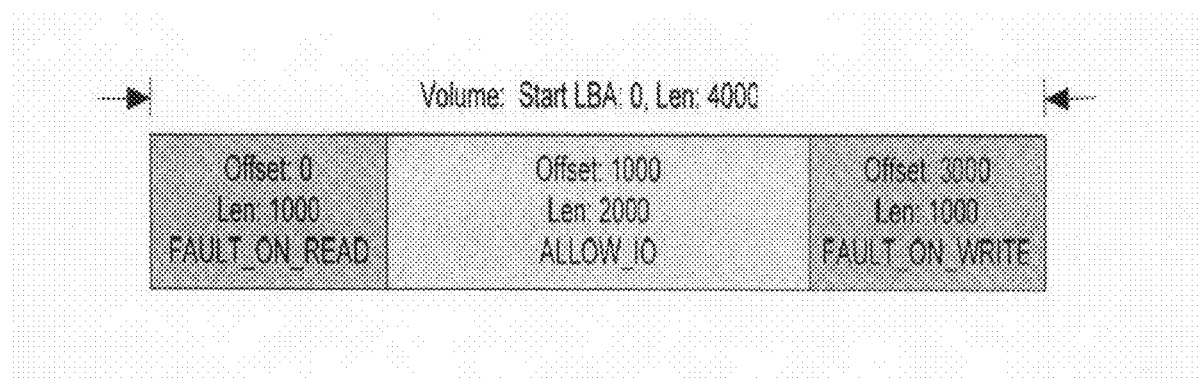
FIG. 4 shows Volume Permissions applied on a Logical block address (LBA) range within a volume.

A permission consists of the permission attributes (FAULT_ON_READ, FAULT_ON_WRITE, ALLOW_IO, HOLD_IO) and the region (offset, length) in the corresponding volume affected thereby. These permissions can be applied on an LBA range within a volume. At any point in time, there can be multiple permissions on a volume on different LBA ranges, as shown in FIG. 4. In this example, if an IO happens in the LBA range 0 to 1000, all READ operations will get faulted back to the storage application. Further, if an IO happens in the LBA range offset: 1000 Length: 2000, both the READ and WRITE operations will be continued. Furthermore, if an IO happens in the LBA range offset: 3000 Length: 1000, all WRITE operations will get faulted back to the storage application. In a volume graph, permissions could be independently applied at any volume level.

Volume Extent

A volume extent is defined as a region in a volume. It is represented by the (offset, length) tuple where offset is zero based from the start of the volume, and length represents the size of the region. The basic unit of offset and length is blocks. Typically, an entire volume range can be broken down into a list of contiguous extents.

Permission Mask

A permission mask enumerates the various permissions that have been applied to a volume extent. In the algorithm, this mask is represented as an enum:

```
enum VolumePermissionMask {
    ALLOW,
    FAULT,
    HOLD
};
```

Permission Map Entry

A volume can be represented as a list of contiguous extents and each extent can have its associated permissions applied on that region. This is called a permission map entry and consists of the volume region and its associated permissions. Since the same permission can be applied multiple times on the same region, the permissions are reference counted. In the algorithm, this is represented by the following structure:

```
struct VolumePermissionMapEntry {
    uint32_t        offset;              // Region Offset
    uint32_t        length;              // Region Length
    VolumePermissionMask readPermission; // Fault/Allow/Hold on Read
    VolumePermissionMask writePermission;// Fault/Allow/Hold on Write
    struct permissionRefCount {
        uint32_t holdCount;              // hold count
        uint32_t readFaultCount;         // read fault count
        uint32_t writeFaultCount;        // write fault count
    };
};
```

Permission Map

Figure 5:
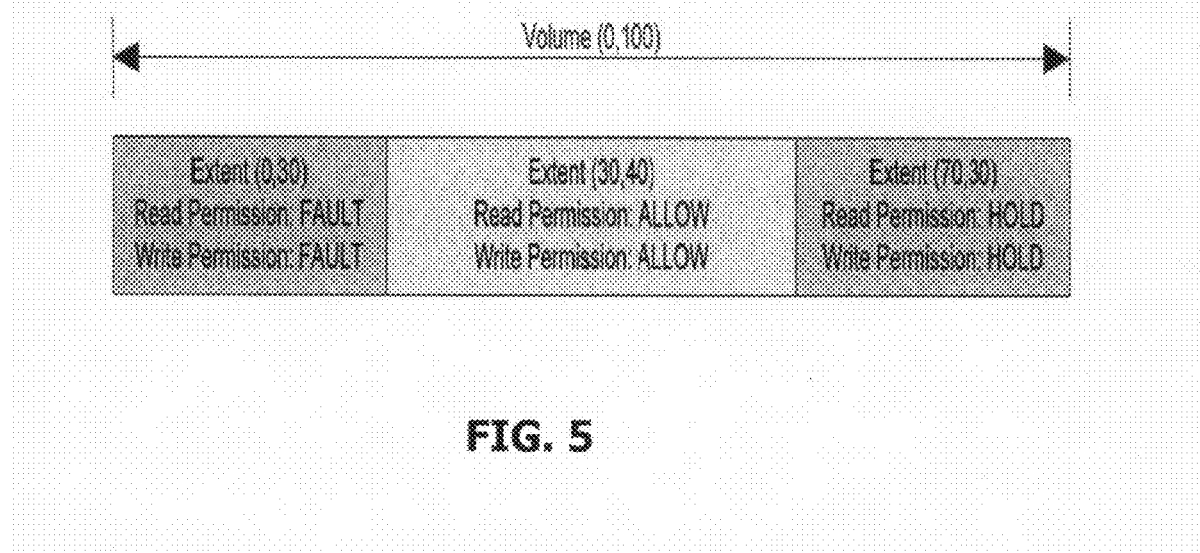
FIG. 5 shows a Sample Volume Permission Map.

A permission map for a volume is a list of contiguous permission map entries. It can be represented as follows:

ListOf
<VolumePermissionMapEntry>VolumePermissionMap;

FIG. 5 shows an exemplary diagram of an entire volume region being represented as a set of contiguous permission map entries, resulting in a permission map. In this example, the volume is assumed to be of size 100 blocks.

A volume graph can consists of heterogeneous volume types (concat, slice, mirrored etc.). Since the volumes are stacked hierarchically over each other, there is a parent-child relationship already established. To attain the objective of the present invention, every volume type is expected to provide functionality for two basic models:

(A) mapRegionInChild

This method allows a region in a parent volume to be mapped into corresponding regions in the child volume(s). A volume graph can consist of heterogeneous volume types (concat, simple, mirror) and each volume type will have a different algorithm for mapping regions in its child volumes. It may be assumed that such a mapping function is available for every type of volume. In object oriented terminology, this is assumed to be a polymorphic method available in the generic volume class.

Figure 6A:
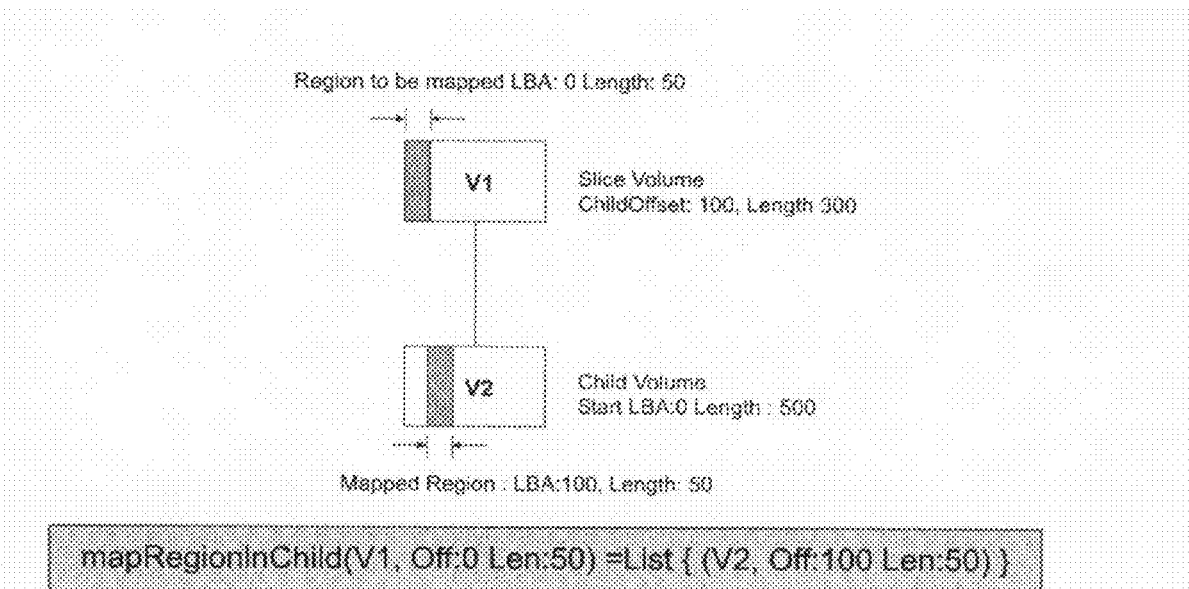
FIGS. 6a and 6b show exemplary diagrams illustrating the map RegionInChild technique for a Slice Volume and Concat Volume, respectively.
Figure 6B:
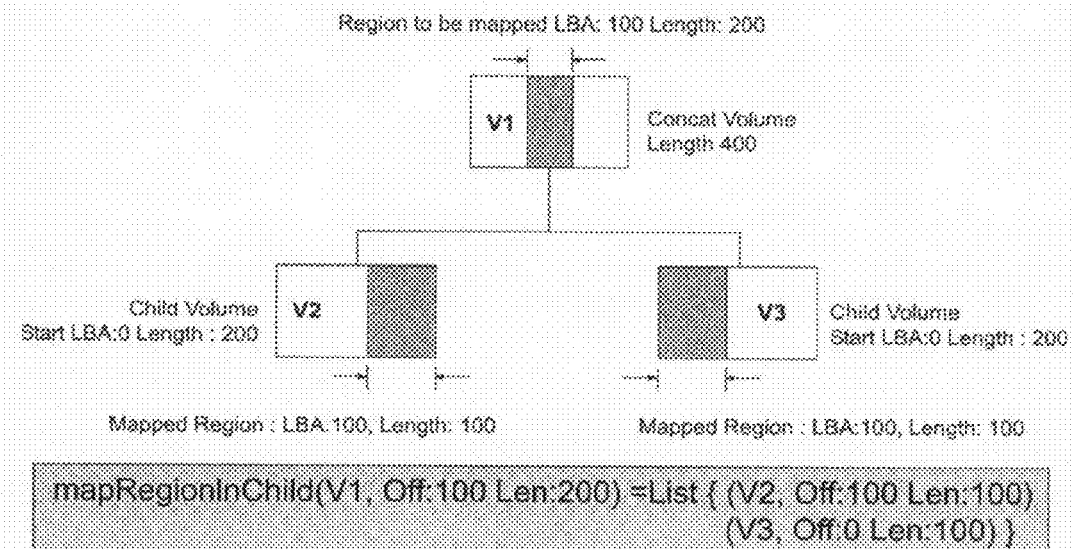

The behavior of the function for different kinds of parent volume types (and in particular for Slice and Concat volume types) is explained below:

FIGS. 6a and 6b show exemplary diagrams illustrating the mapRegionInChild technique in respect of the parent volume types being Slice Volume and Concat Volume, respectively.

mapRegionInChild for a Slice Volume

In this case, there is only one child volume possible and the region in the parent volume gets offseted by the ChildOffset, as shown by the example illustrated in FIG. 6a.

mapRegionInChild for a Concat Volume

A concat is made up of many child volumes and a region in a concat volume can map into more than one child volumes depending on the range, as shown by the example illustrated in FIG. 6b.

The expected output of the function mapRegionInChild is a list, each element of which contains the tuple (ChildVolume, Mapped LBA range), as depicted in aforesaid FIGS. 6a and 6b.

(B) mapChildRegion

This method works the other way from mapRegionInChild. It allows a region in a child volume to be mapped to the corresponding region in the parent volume. A volume graph can consist of heterogeneous volume types (concat, slice, mirror etc.) and each volume will have a different algorithm for mapping child regions in its corresponding parent volumes. It may be assumed that such a mapping function is available for every type of volume.

Figure 7A:
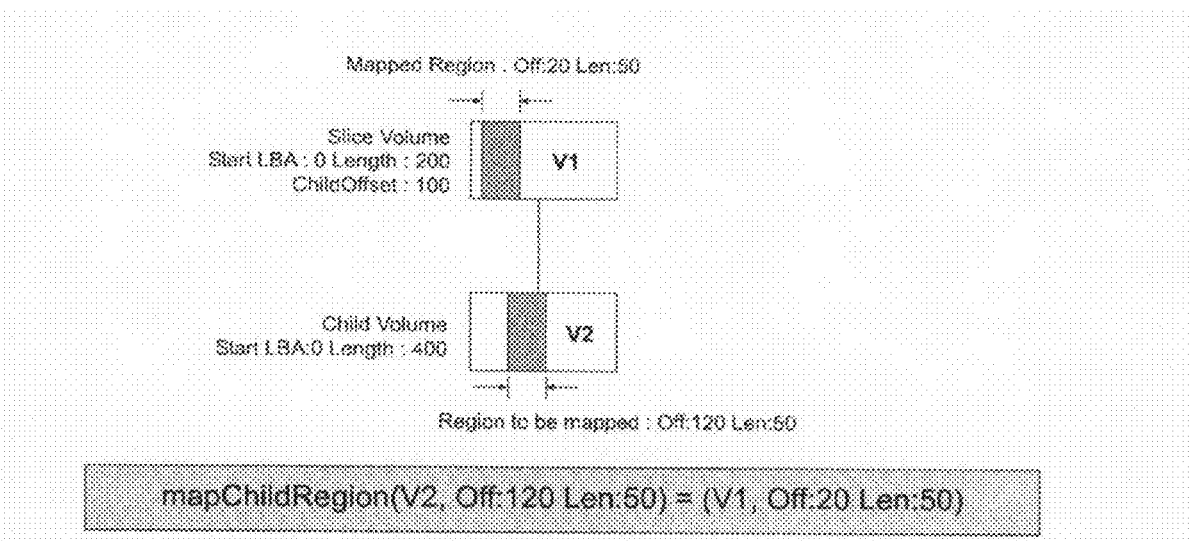
FIGS. 7a and 7b show exemplary diagrams illustrating the mapChildRegion technique for a Slice Volume and Concat Volume, respectively.
Figure 7B:
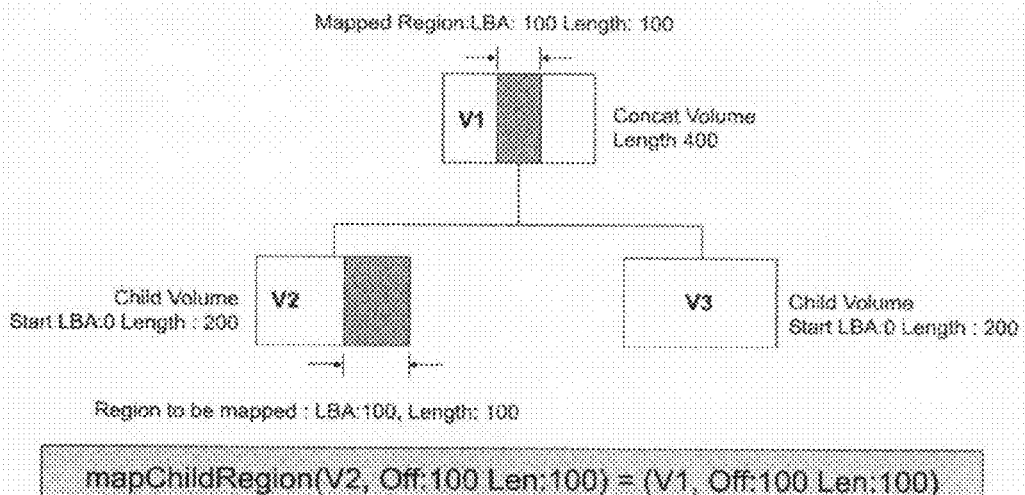

FIGS. 7a and 7b show exemplary diagrams illustrating the mapping technique of the mapChildRegion method for a Slice Volume and Concat Volume, respectively.

mapChildRegion for a Slice Volume

A region in a child volume with a Slice volume as its parent just maps the LBA range directly with adjustment done for the ChildOffset, as shown by the example illustrated in FIG. 7a.

mapChildRegion for a Concat Volume

A region in a child volume with Concat volume as its parent, maps in the corresponding area in the parent volume which the said child volume represents, as shown by the example illustrated in FIG. 7b.

The expected output of the function mapChildRegion is the tuple containing the parent volume and the mapped region in the parent volume.

Apart from the above described two main methods, each volume object is adapted to maintain a local permission map, which represents the permissions applied at that volume.

Figure 8:
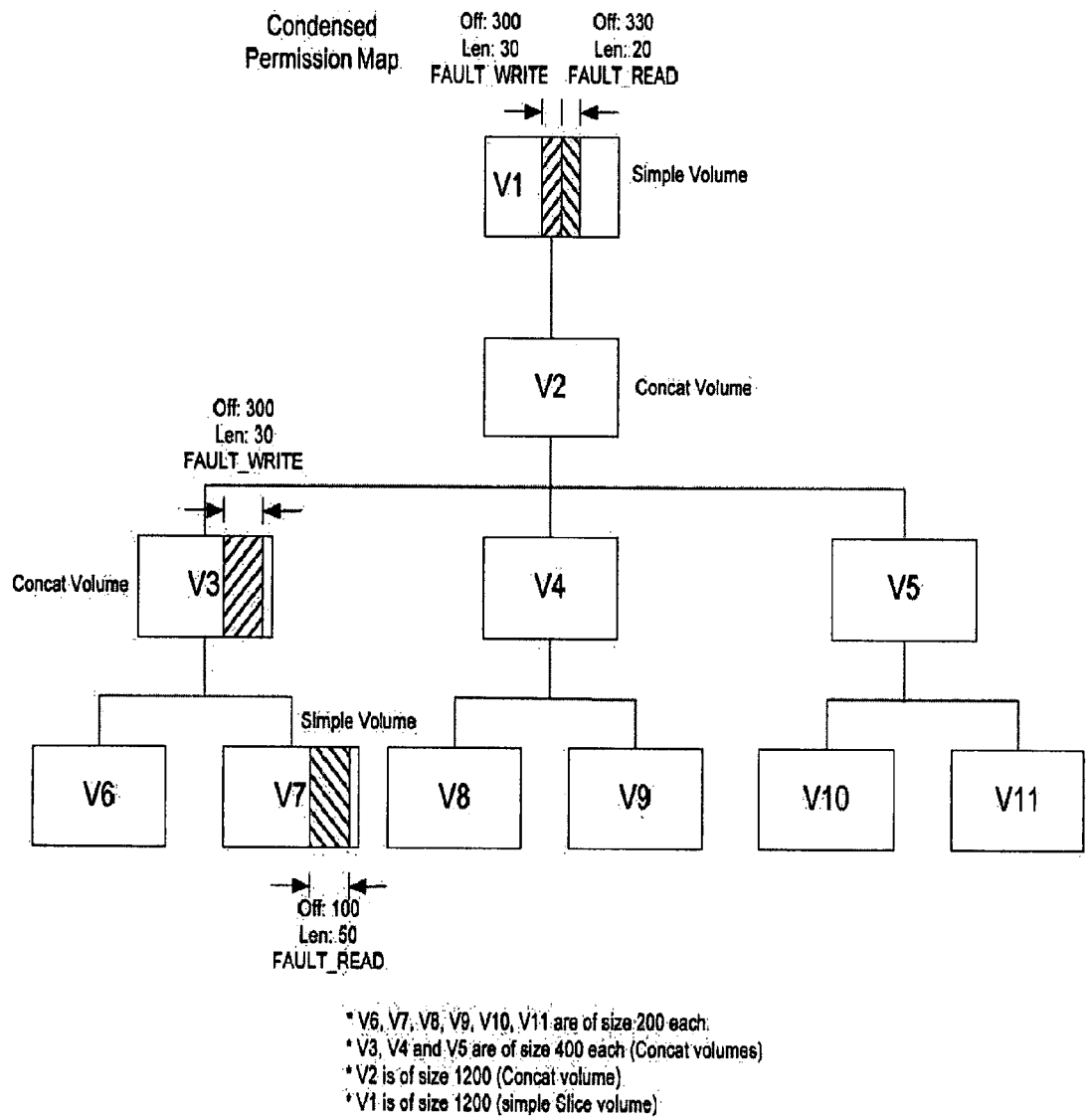
FIG. 8 shows the technique of calculating Top Level Volume Permissions, according to the present invention.

The calculation of cumulative permissions, according to the present invention, is depicted in FIG. 8. The calculation is based upon the concept of condensing or "ORing" of permissions. Permissions can be applied by storage applications at any level in the hierarchy. More than one permission can be applied on a given volume resulting in a permission map for that volume. This map can dynamically change as per the current permission settings. To attain the objective of the present invention, this map is required to be applied on the switches, for which it needs to be condensed into a single map for the entire volume graph.

The example depicted in FIG. 8 shows a typical hierarchical permission map, where individual volumes (V7 and V3) have permissions set on certain regions and the effective condensed permission map is calculated for the entire graph at the top level volume (TLV).

A permission of FAULT_ON_READ has been applied on the volume V7 of the layered volume graph, on the LBA range offset: 100 Length: 50, whereas another permission FAULT_ON_WRITE has been applied on the volume V3, on the LBA range offset: 300 and Length: 30.

The calculation of cumulative permissions on the top level volume (V1) is started from the lower most volume (leaves of the graph), working the way upwards. The regions in the leaves are mapped to the corresponding regions in parent volumes and so on till the top level volume is reached. In the event of any permission being found set for a region on the way, a note of it is made. If the corresponding region in the parent volume has a different permission set, then the permissions of the parent take precedence. In the event of the mapped regions in the parent being set to ALLOW_IO, the corresponding child permissions are continued, that is promoted. This process continues till all the regions in the leaves are mapped and effective permissions calculated.

Figure 9:
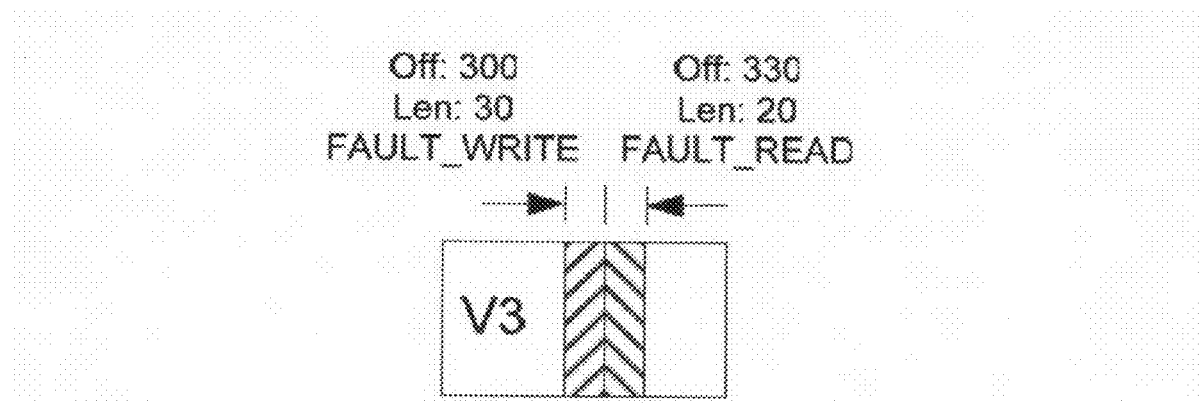
FIG. 9 shows the effective Top Level Volume Permissions, achieved by implementing the technique, according to the present invention.

Applying this method to the hierarchical volume graph in FIG. 8, permission FAULT_ON_READ on child volume V7 (LBA range offset: 100, Length: 50) maps to the corresponding region offset: 300, Length: 50 in its parent volume V3. Since, the corresponding region in the parent volume V3 already has a permission FAULT_ON_WRITE set on the LBA range offset: 300, Length: 30, applying the aforesaid logic of precedence, parent permission for the length of 30 blocks is maintained and child volume permission is promoted for the rest of the parent length i.e. for 20 blocks. Accordingly, effective permissions at volume V3 stand as shown in FIG. 9. Continuing this logic throughout the hierarchical volume graph leads to the final cumulative permissions for the top level volume(TLV) V1, which is the effective Top Level Volume Permissions as shown in the diagram of FIG. 9.

The size of the various volumes in the hierarchical volume graph may be suitably modified to meet the needs of a particular computer implementation.

The mechanism of mapping hierarchical volume permissions to top level permissions in a volume graph structure and the application of cumulative permissions on the intelligent multi-protocol switch, according to the present invention, involves two main sub-steps:

Applying the permission locally on a volume.

Calculating the condensed permissions hierarchically for the entire volume graph.

Applying Volume Permissions on a Volume

Each volume maintains a local permission map which contains the permissions applied on that volume. Said local permission map is maintained as a list of permission map entries. Each of the permissions is reference counted in order to allow the same permissions to be set by multiple clients. In order to reduce the complexity and the number of entries in the volume permission map, the algorithm provides for condensation of the permission map by reducing redundancy and applies merge logic which combines adjacent extents in a volume if they happen to have similar permissions. The merge logic is explained hereinafter.

Figure 10:
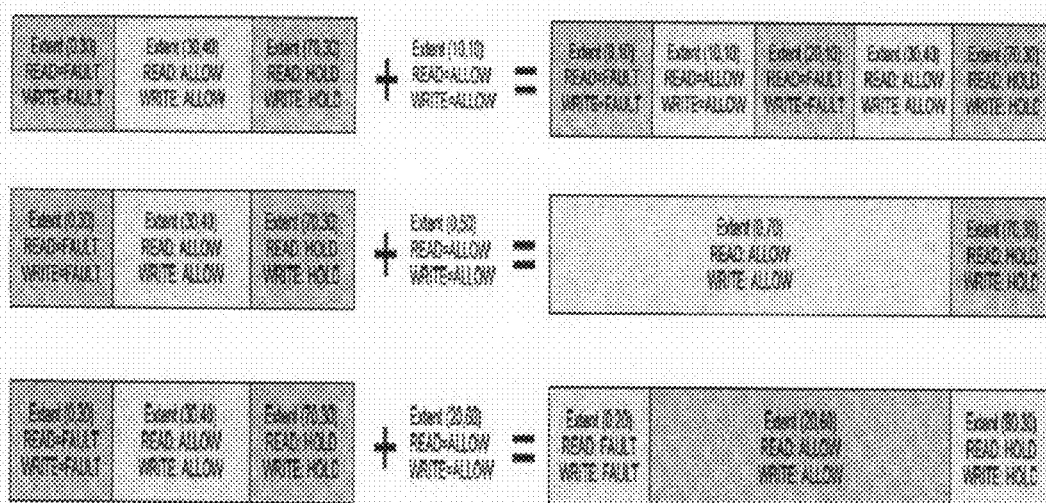
FIG. 10 shows how local volume permission maps get modified, according to the present invention.

When a request to apply new permissions is received, the algorithm works by calculating the existing regions in the volume which get affected. FIG. 10 shows how a permission map for a volume changes as and when various permissions are applied to the volume. The previous permissions are overwritten with newly modified permissions.

Local volume permission maps get modified in the following manner:

Old Permission Map+New Permissions=New Permission Map

Calculating Condensed Permissions

Once the local volume permission map has been applied, it needs to be rolled up to the top level volume or the root of the volume graph for calculating the effective permission for the entire graph. For every region in the root volume which has permission set to ALLOW, the corresponding region is mapped into its child volumes, using the mapRegionInChild method. If the corresponding child regions have non ALLOW permissions, those permissions are rolled up to the root level. In case the corresponding region in child is also set to ALLOW, then the process continues to the next child level. It continues until either all root ALLOW regions have been filled up by rolling child permissions or we have reached the end of the graph. If the end of the graph is reached, the corresponding root region gets set to ALLOW.

The basic idea underlying this technique is that ALLOW is considered as a hole and whenever there is a hole detected, all child permissions in the volume graph are explored to ascertain whether permissions from a lower level can be promoted to fill the hole. The default permission being ALLOW, which is the least restrictive in nature, is applied at the top level of the graph, and the entire graph is explored from the top through down the graph looking for more restrictive ones.

Figure 11:
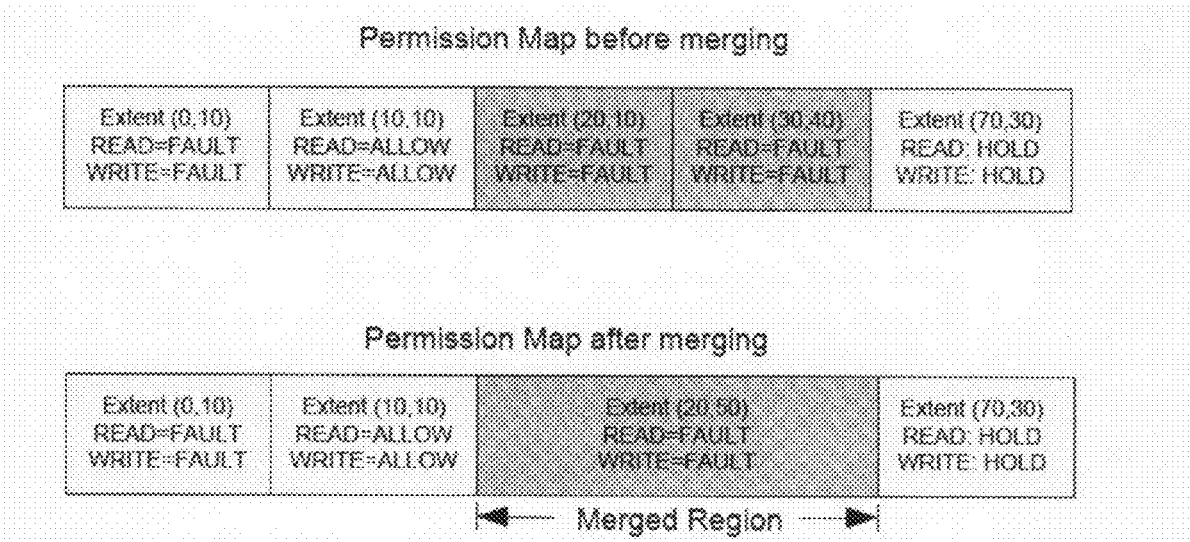
FIG. 11 shows the technique of Merging adjacent regions of a Volume Permission Map, according to the present invention.

At any volume level, if adjacent regions of a volume have similar permissions, then it can be thought of as though the same permissions were applied to the combined region. This facilitates in merging of the adjacent regions into a single region with a bigger size, hence reducing the number of permission entries in a permission map. Consequentially, the size of the permission map is reduced. The technique of merging adjacent regions of a Volume Permission Map, according to the present invention, is shown in FIG. 11.

In the process of mapping condensed permissions to the top level volume, an appropriate message is generated for a host trying to access a volume extent with FAULT_ON_READ or FAULT_ON_WRITE or HOLD_IO permission.

Pseudo Code

Figure 12:
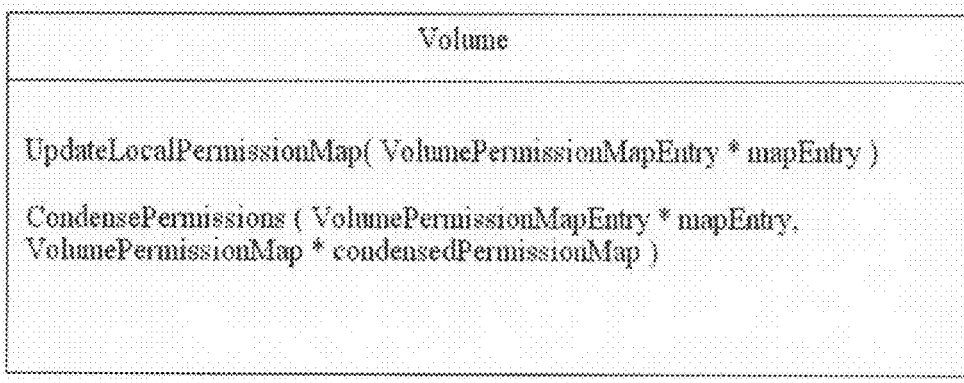
FIG. 12 shows Class Diagram of Volume in accordance with the present invention.

There is no restriction on programming language for implementing the algorithm. The various methods, according to the present invention, may be implemented in any programming language (like "C", "C++" or "Java"). For purpose of illustration only, the pseudo code is represented here in a C++ style of coding. For the purpose of the algorithm, a volume is represented as a class containing the above methods. FIG. 12 shows Class Diagram of Volume in accordance with the present invention.

```
typedef ListOf <VolumePermissionMapEntry> VolumePermission
Map ;
Class Volume
{
   public :
      UpdateLocalPermissionMap(VolumePermissionMapEntry*
      mapEntry) ;
      CondensePermissions (VolumePermissionMapEntry* mapEntry,
            VolumePermissionMap* condensedPermissionMap) ;
   private :
      VolumePermissionMap volumeMap ;
}
```

In considering the specific manner in which the invention operates, the two main sub-steps involved in carrying out the methodology of the invention are as follows:

The method UpdateLocalPermissionMap updates the local permission map of a volume. It basically works by calculating existing map entries which will get affected and then overwriting the new permissions. If the new region intersects any old map entry regions, the old regions are split.

The method CondensePermissions condenses the permissions for a region specified by mapEntry argument. It traverses down the graph to every child volume until permissions for the entire mapEntry region are calculated or the end of the graph is hit.

Figure 13A:
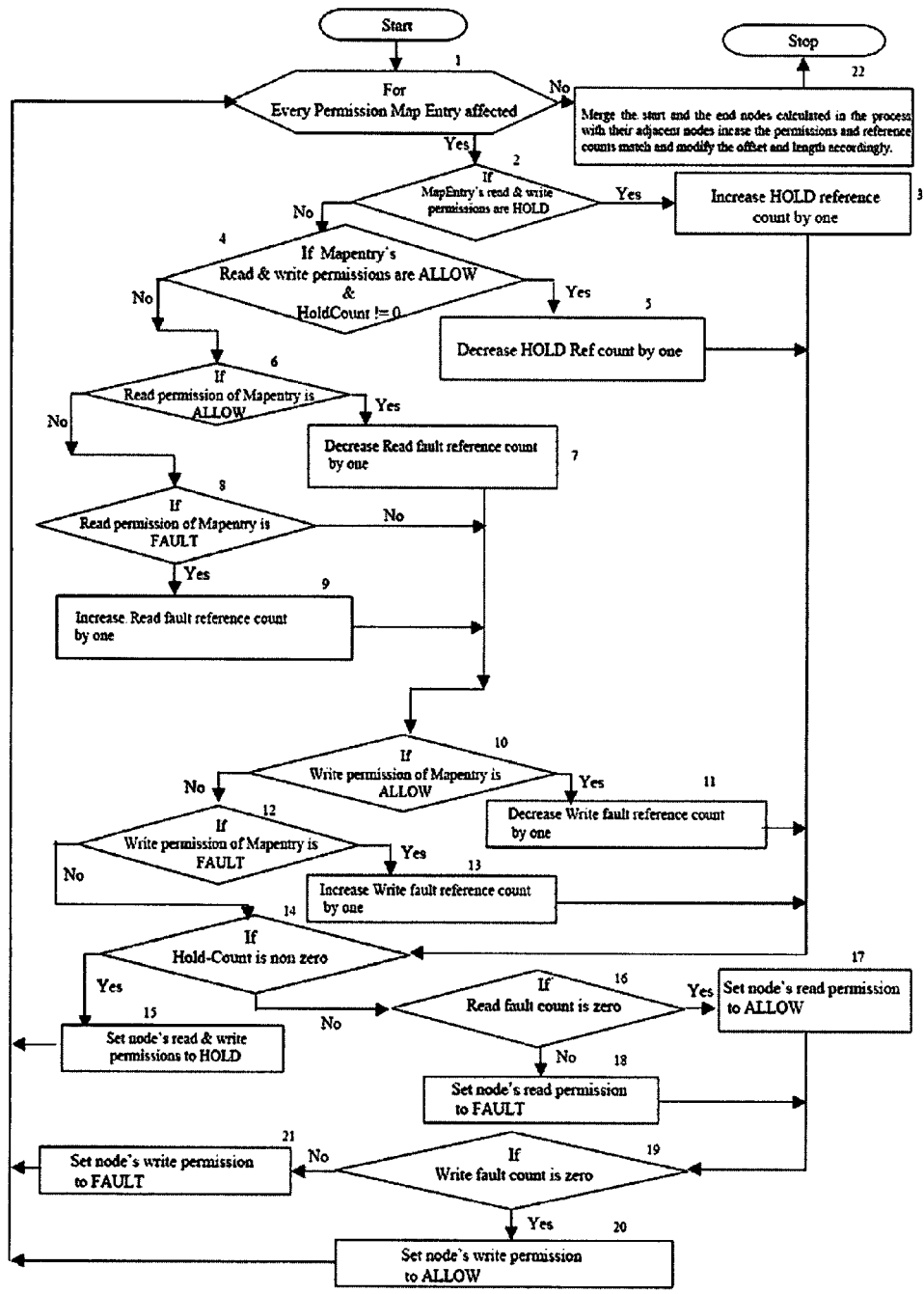
FIG. 13a and FIG. 13b show diagrammatic flow-chart illustrations of the mechanism of mapping hierarchical volume permissions to top level permissions, according to the present invention.
Figure 13B:
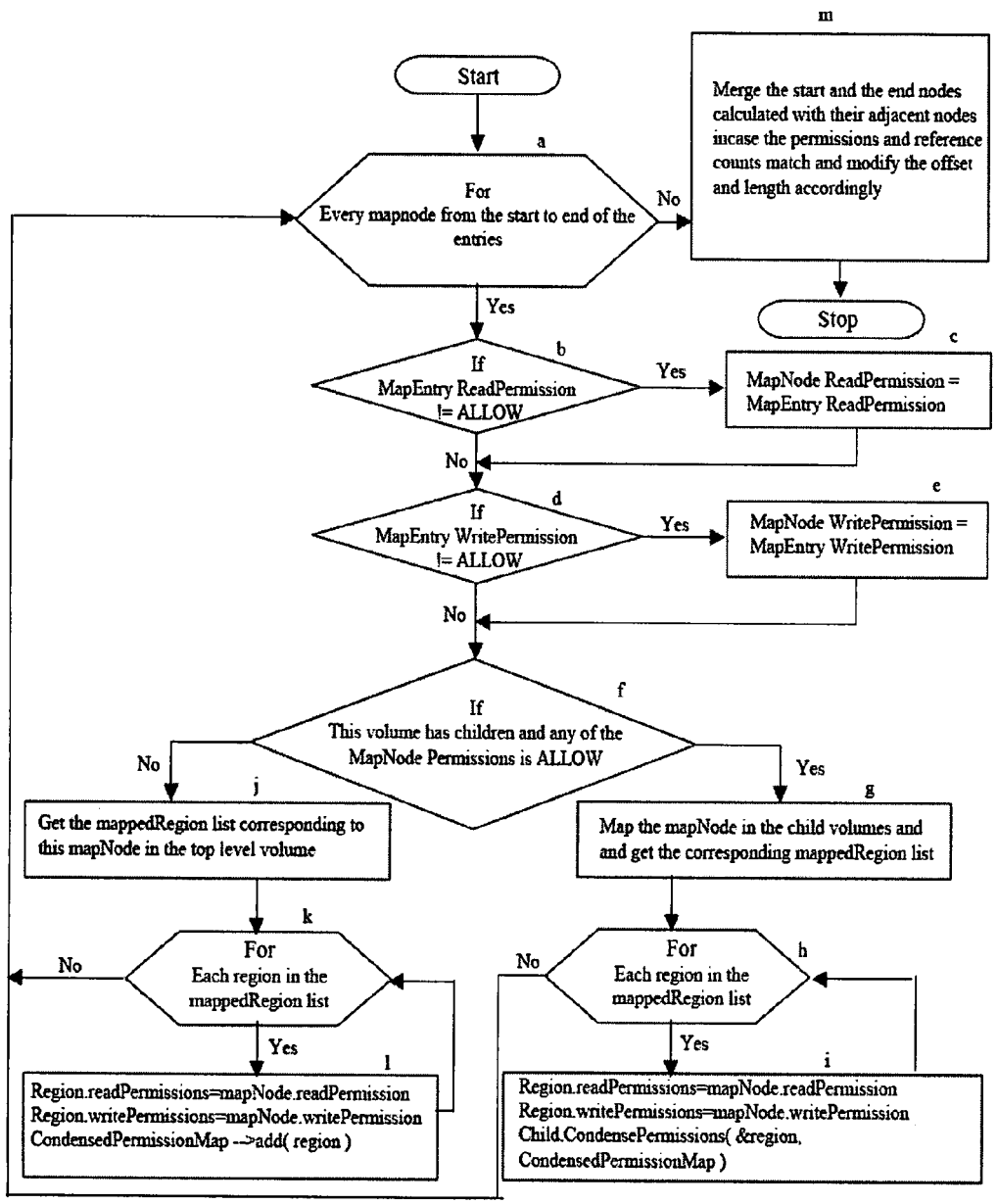

FIGS. 13a and 13b show flow diagrams of the mechanism of mapping hierarchical volume permissions to top level permissions in a volume graph structure, according to the present invention.

Applying Volume Permissions (Permission locally on a volume)

To attain the objective of the present invention, at every volume level a method called 'update' needs to be implemented as follows:

```
Volume: :UpdateLocalPermissionMap(VolumePermissionMapEntry*
mapEntry)
{
   for (every permissionMapEntry affected)
   {
      if the mapEntry's read and write permissions are HOLD
      {
         node - >permissionRefCount.holdCount++
      }
      else if (mapEntry's read and write permissions are ALLOW &&
            node ->permissionRefCount.holdCount != 0)
      {
         node - >permissionRefCount.holdCount--
      }
      else
      {
         if (read permission of mapEntry is ALLOW)
         {
            node - >permissionRefCount.readFaultCount--
         }
         else if (read permission of mapEntry is FAULT)
         {
            node - >permissionRefCount.read FaultCount++
         }
         if (write permission of mapEntry is ALLOW)
         {
            node - >permissionRefCount.writeFaultCount--
         }
         else if ( write permission of mapEntry is FAULT)
```

-continued

```
         {
            node - >permissionRefCount. writeFaultCount++
         }
      }
      if (node - >permissionRefCount.holdCount is non-zero
      {
         Set node's read and write permissions to HOLD
      }
      else
      {
         if (node->permissionRefCount.readFaultCount is zero)
         {
            Set node's read permission to ALLOW
         }
         else
         {
            Set node's read permission to FAULT
         }
         if (node->permissionRefCount.writeFaultCount is zero)
         {
            Set node's read permission to ALLOW
         }
         else
         {
            Set node's write permission to FAULT
         }
      }
   }
   Merge the start and the end nodes calculated above with their adjacent
nodes incase the      permissions and reference counts match and
modify the offset and length accordingly.
}
```

The method UpdateLocalPermissionMap calculates the map entries in the volume's permission map which will get affected, as illustrated in FIG. 13a. For this, the start and end permission map entries are found from the list of permission map entries in the said volume corresponding to the mapEntry region. The method starts at block 1 and continues, via block 2, where in the event of mapEntry's READ and WRITE permissions being set to HOLD, the HOLD reference count is incremented by one (block 3). On the contrary, if the mapEntry's READ and WRITE permissions are ALLOW and the HOLD reference count is zero (block 4), the HOLD reference count is decremented by one (block 5) if set, since HOLD takes higher precedence than FAULT. Otherwise, the READ permissions are handled, whereby in the event of mapEntry's READ permission being set to ALLOW (block 6), the READ FAULT reference count is decremented by one (block 7), because a previously set READ FAULT is being set to ALLOW. On the contrary, if the mapEntry's READ permission is FAULT (block 8), the READ permission is set to FAULT and the READ FAULT reference count is incremented by one (block 9). While handling the WRITE permissions, in the event of mapEntry's WRITE permission being set to ALLOW (block 10), a previously set WRITE FAULT reference is set to ALLOW, so WRITE FAULT reference count is decremented by one (block 11). On the contrary, if the mapEntry's WRITE permission is set to FAULT (block 12), the WRITE FAULT reference count is incremented by one (block 13).

Based on the reference counts, new permissions are set. If HOLD reference count is a non zero value (block 14), the node's READ and WRITE permissions are set to HOLD (block 15). On the contrary, if READ FAULT reference count corresponds to zero (block 16), then the node's READ permission is set to ALLOW (block 17), otherwise it is set to FAULT (block 18). Similarly, if WRITE FAULT reference count corresponds to zero (block 19), then the node's WRITE permission is set to ALLOW (block 20), otherwise it is set to FAULT (block 21).

At this point there may be adjacent permission map entries in the map which might have similar permissions and reference counts. The method terminates at block 22 where the entries can be merged in order to create a compact map.

Calculating Condensed Permissions

The cumulative permissions for a mapEntry region are calculated, as illustrated in FIG. 13b, starting from the top level volume going down to children until the permissions are no longer ALLOW or there are no more children.

```
Volume: :CondensePermissions(VolumePermissionMapEntry* mapEntry,
        VolumePermissionMap* condensedPermissionMap)
{
   for (every mapNode from the start to end of the entries)
   {
      if (mapEntry->readPermission != ALLOW)
      {
         mapNode.readPermission = mapEntry->readPermission
      }
      if (mapEntry->writePermission != ALLOW)
      {
         mapNode.writePermission = mapEntry->writePermission
      }
      if (this volume has children and any of the mapNode
            permissions(read or write) is ALLOW)
      {
         Map the mapNode in the child volumes and get the corresponding
mappedRegion list.
         for (each region in the mappedRegion list)
         {
            region.readPermissions = mapNode.readPermission
            region.writePermissions = mapNode.writePermission
            child.CondensePermissions(&region,
condensedPermissionMap)
         }
      }
      else
      {
         Get the mappedRegion list corresponding to this mapNode in the
top level      volume (volume where the process started).
         for (each region in the mappedRegion list)
         {
            region.readPermissions = mapNode.readPermission
            region.writePermissions = mapNode.writePermission
            condensedPermissionMap->add(region)
         }
      }
   }
   Merge the start and the end nodes calculated above with their adjacent
nodes incase the permissions and reference counts match and modify the
offset and length accordingly.
}
```

The method of calculating effective cumulative permissions starts at block a and continues, via block b, where in the event of mapEntry's READ permission being set to ALLOW, the READ permission of mapnode is taken to be equal to the mapEntry's READ permission (block c). On the contrary, if the mapEntry's WRITE permission is set to ALLOW (block d), then the WRITE permission of mapnode is taken to be equal to the map Entry's WRITE permission (block e).

If the volume has children and any of the mapNode's READ or WRITE permission is set to ALLOW (block f), then the parent region is passed to the child volume and the process of condensing of the region permissions is continued (blocks g, h and i), as a result of which, a list of corresponding mapped Region in the child volume is obtained. On the contrary, if the permissions are no longer ALLOW or the volume has no children, the region is mapped back to the top level volume (that is the volume where the process started) and added to the condensed Permission Map (blocks j, k and l).

At this point there may be adjacent permission map entries in the map which might have similar permissions and reference counts. The method terminates at block m where the entries can be merged in order to create a compact map.

This technique can be applied to any system having a hierarchy of objects requiring permissions (or access control) at every object level. The algorithm is generic in nature and can be used to calculate effective object graph permissions (or access control).

Figure 14:
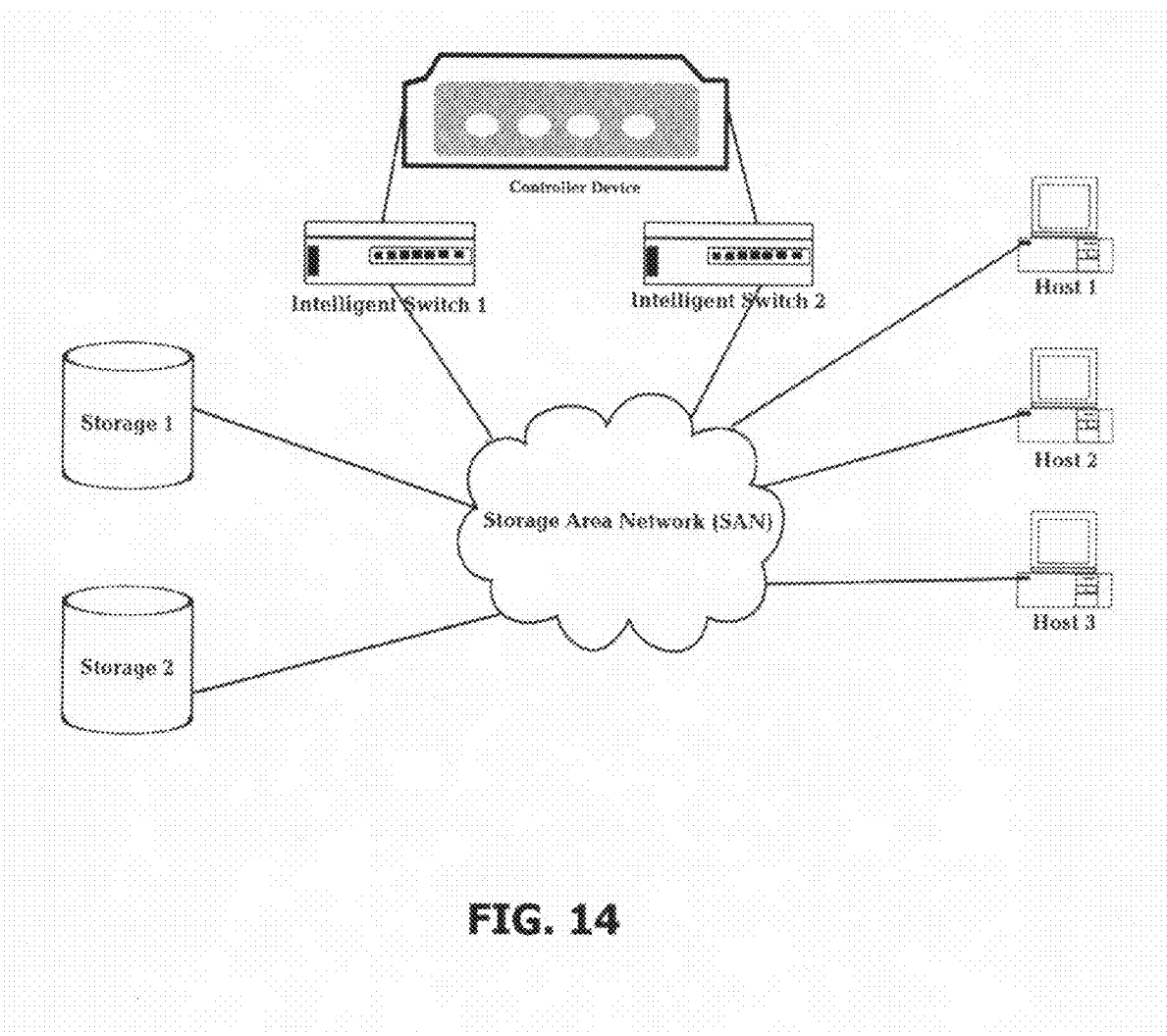
FIG. 14 shows an exemplary diagram of a system for implementing the present invention.

The present invention typically runs on a generic controller hardware which has connectivity to the intelligent switches. FIG. 14 illustrates an exemplary diagram of a system for implementing the present invention. The controller device resides in the network as shown in the diagram of FIG. 14. The storage area network (SAN) of the system, as illustrated in FIG. 14, is connected to a plurality of host computers (such as 'Host1', 'Host2', 'Host3', etc.), and physical storage arrays (such as 'Storage 1', 'Storage 2', etc.). In a preferred embodiment, controller device and the applications running on the controller virtualize the physical storage into a virtual storage with a hierarchical volume graph structure and said storage application is also adapted to apply permission for individual volumes in the volume graph and for condensing, combining and accumulating individual volume level permissions to the top level volume so that intelligent switch(es) connected to the top level volume in the hierarchy may read the resultant top level hierarchical permission as set for access control.

As an alternative to above preferred embodiment, the application for storage virtualization, and/or for applying permission at individual volume level and/or for setting condensed, combined and accumulative hierarchical permission at the top most level may also run on the intelligent switch(es) instead of running on a separate controller device.

The number of storage devices, hosts and intelligent switches, as shown in FIG. 14, are just for the example. There is no theoretical limit on these numbers as such. The controller device could be any network device capable of running this algorithm with processing capability and network connectivity.

Each virtualized storage volume can be presented to a cluster of hosts. The permissions on the volume are not affected by the number of hosts connected to the volume, in as much as, it is the storage applications which set permissions. The storage applications run on the controller device. I/O initiated by the hosts gets affected due to permissions placed on the volume. If permissions on a volume change, it affects I/O from all hosts connected to it.

Figure 15:
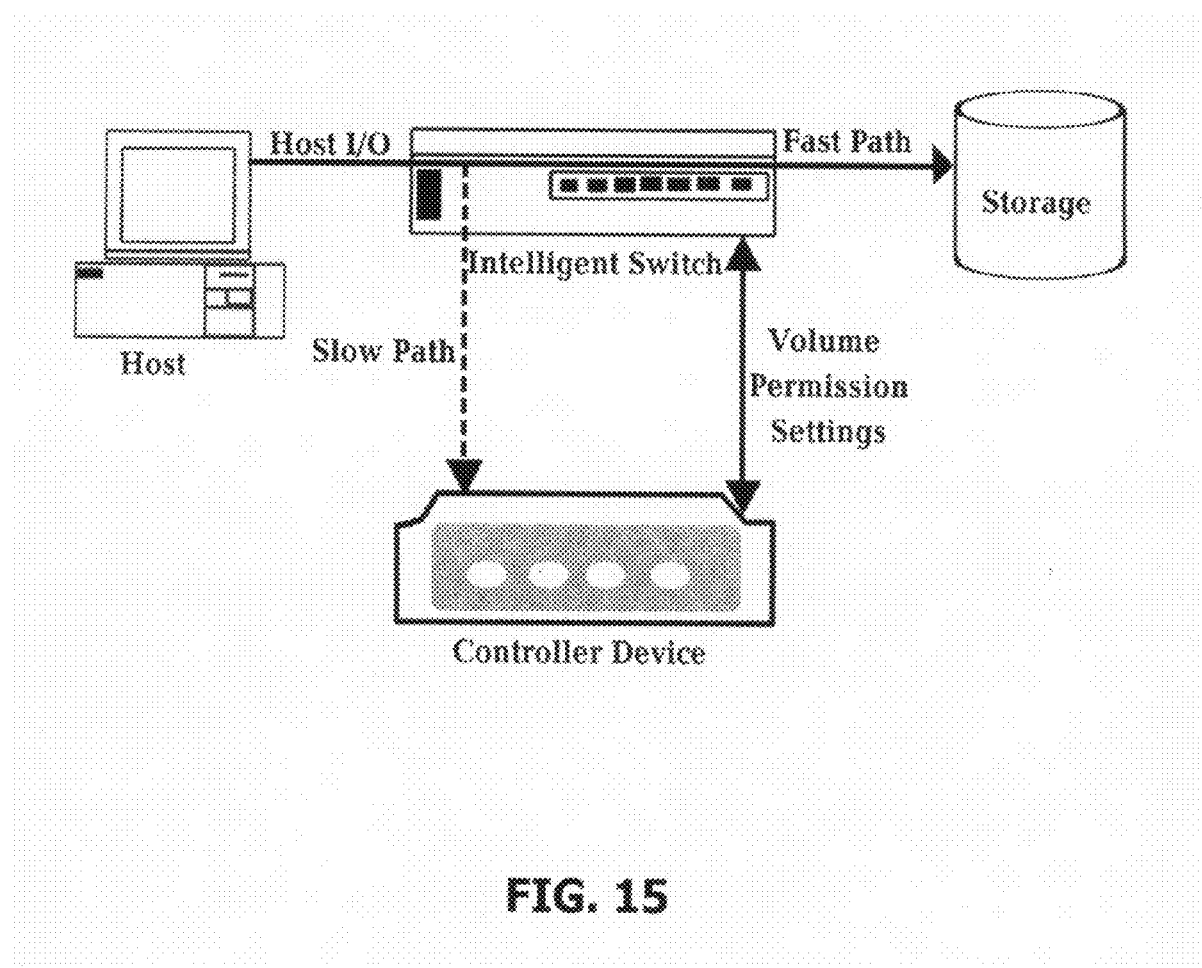
FIG. 15 shows how the I/O issued by a host is split into Fast Path and Slow Path, according to the present invention.

The host does not have direct access to the storage. All I/O goes through the intelligent switch(es), where it gets broken into Fast Path or Slow Path. FIG. 15 shows how the I/O issued by host is split into Fast Path and Slow path by the intelligent switch. Which physical storage device the I/O finally lands on, is determined by the mapping logic running on the intelligent switch port. The volume permissions are controlled by the software running on the controller device or the intelligent switch(es) as the case may be. The volume permissions determine whether the Fast Path I/O should get faulted back to the storage application or allowed to go to the physical storage as per the mapping rules.

While the invention has been described with particular reference to the illustrated embodiment, numerous modifications thereto may be apparent to those skilled in the art. Accordingly, the above description and accompanying drawings should only be taken as illustrative of the invention and not in a limiting sense.

We claim:

1. A computer implemented method of mapping hierarchical volume permissions to top level volume permissions in a layered volume graph structure of a virtualized data storage system having a hierarchy of storage volumes requiring permissions at every volume level, wherein a top level volume is exposed to a plurality of hosts via at least one intelligent multi-protocol switch said method comprising:
    applying volume permissions comprising FAULT_ON_READ, FAULT_ON_WRITE and ALLOW_IO, on a volume in a storage area network (SAN) within said volume graph structure;
    merging adjacent extents in the volume with similar permissions to provide a condensed permission for the top level volume to reduce redundancy;
    mapping the condensed permission hierarchically for the volume graph structure to the top level volume from an individual volume permission comprising:
    applying ALLOW_IO permission, as the default permission, at a region of the top level volume;
    mapping the region of the top level volume into child volumes by traversing down the layered volume graph structure; and
    rolling up child permissions to a parent level volume, in the event of the corresponding child regions having a non ALLOW permission.

2. The method as claimed in claim 1, wherein said storage volumes comprise storage applications.

3. The method as claimed in claim 1, wherein said step of applying volume permissions on a volume involves first determining a Logical Block Address (LBA) range in the volume affected by a first permission and a second permission and then applying the first permission and second permission to the affected range while overwriting the second permission on the first permission for overlapping range of the first and second permission.

4. The method as claimed in claim 3, wherein each volume has a local permission map which contains permissions applied on different extents of LBA ranges within said volume.

5. The method as claimed in claim 4, wherein said LBA range of a volume starts from 0 and ends at the maximum capacity of the volume.

6. The method as claimed in claim 4, wherein said permission map for a volume is a list of contiguous permission map entries comprising contiguous volume extents identified by a tuple (offset, length), the offset being zero based from the start of the volume and length being the size of the extent, and the permissions applied on each of the volume extents.

7. The method as claimed in claim 3, wherein in the event of new region intersecting any old map entry regions, said old regions are caused to split.

8. The method as claimed in claim 1, wherein said permissions which are applied on said volume, are adapted to control the action which ought to be taken in the event of an IO happening on a Logical Block Address (LBA) range within said volume affected by the permission.

9. The method as in claim 1, wherein said permissions further comprise a HOLD_IO permission.

10. The method as claimed in claim 1, wherein FAULT_ON_READ permission applied on a specific LBA range results in all READ operations being faulted back to a storage application.

11. The method as claimed in claim 1, wherein FAULT_ON_WRITE permission applied on a specific LBA range results in all WRITE operations being faulted back to a storage application.

12. The method as claimed in claim 9, wherein HOLD_IO permission applied on a specific LBA range results in all operations being kept on hold until the permission is changed.

13. The method as claimed in claim 1, wherein ALLOW_IO permission applied on a specific LBA range results in both READ and WRITE operations being allowed on the specified range.

14. The method as claimed in claim 1, wherein a parent-child relationship is established by the arrangement of the volumes in the layered volume graph structure, said volumes being stacked hierarchically over each other.

15. The method as claimed in claim 1, wherein
    rolling up the child permissions to the parent level volume comprises:
    continuing the process to a next child level volume, in the event of the corresponding region in a preceding child volume being set to ALLOW permission;
    continuing the process until all top level volume ALLOW regions have been filled up by said rolling up the child permissions; and in response to reaching the end of the volume graph setting the corresponding top level volume region to ALLOW_IO permission.

16. The method as claimed in claim 15, wherein an appropriate message is generated for a host trying to access a volume extent with at least one of:
    the FAULT_ON_READ permission;
    the FAULT_ON_WRITE permission; and
    a HOLD_IO permission.

17. The method as claimed in claim 15, wherein in the event of a different permission being set in the said corresponding region in parent volume, the permissions of said parent volume takes precedence.

18. The method as claimed in claim 1, wherein each volume in the layered volume graph structure is adapted to provide functionality for two basic mapping models, namely mapping of a region in a parent volume into corresponding child volume (mapRegionInChild) and mapping of a region in a child volume into a corresponding region in a parent volume (mapChildRegion).

19. The method as claimed in claim 18, wherein a mapRegionInChild method
    is adapted for mapping of a region in a parent volume into corresponding region in the child volume, the output of said method being a tuple giving the child volume and the mapped region defined by the offset and length in the child volume.

20. The method as claimed in claim 18, wherein a mapChildRegion method is adapted for mapping of a region in a child volume into the corresponding region in the parent volume, the output of said method being a tuple giving the parent volume and the mapped region defined by the offset and length in the parent volume.

21. The method as claimed in claim 1, wherein said virtualized data storage system comprises a first and a second differing physical storage network and device.

22. The method as claimed in claim 1, wherein said layered volume graph structure comprises volumes of various types, such as simple volume, slice volume, concat volume, stripe volume, mirrored volume and any other type of volume.

23. A system for implementing hierarchical permission maps in a layered volume graph structure of a virtualized data storage volume having a hierarchy of storage volumes requiring permissions at a plurality of volume levels, said system comprising:
- at least one intelligent multi-protocol switch connecting at least one host server and a virtualized data storage volume, said at least one switch being adapted to read a hierarchical volume permission set at a top most level of said layered volume graph structure; and
- a processor coupled to the at least one intelligent multi-protocol switch to perform the operations of:
- storage virtualization;
- applying volume permissions comprising FAULT_ON_READ, FAULT_ON_WRITE and ALLOW_IO, on a volume within said volume graph structure;
- condensing permissions from individual volume levels to a top most volume level of said volume graph structure hierarchically for an entire volume graph structure for access control through said at least one intelligent switch, including merging adjacent extents in the volume with similar permissions to provide a condensed permission for the top level volume to reduce redundancy;
- mapping the condensed permission hierarchically for the volume graph structure to the top level volume from an individual volume permission comprising:
- applying ALLOW_IO permission, as the default permission, at a region of the top level volume;
- mapping the region of the top level volume into child volumes by traversing down the volume graph; and
- rolling up child permissions to a parent level volume, in the event of the corresponding child regions having a non ALLOW permission.

24. The system as claimed in claim 23, wherein the operation of storage virtualization includes applying individual volume level permissions and condensing individual volume level permissions to a hierarchical top most volume level permission resides on a controller device that runs a storage application.

25. The system as claimed in claim 23, wherein the operation of storage virtualization includes applying individual volume level permissions and condensing individual volume level permission to a hierarchical top most volume level permission occurs on the at least one intelligent switch.

26. The system as claimed in claim 23, wherein I/O issued by the at least one host server is caused to split into Fast path I/O and Slow path I/O by the at least one intelligent switch and depending on the permission mapped to the top most volume level as read by the at least one switch, the Fast Path I/O is either faulted back to one of a storage application and host allowed access to the storage according to a mapping module.

27. A storage area network connected to a plurality of host computers, wherein the storage is virtual storage with a hierarchical volume structure and a storage application is adapted to set permission for individual volumes in a hierarchical volume graph and also map a hierarchical top level volume permission by condensing, combining and accumulating individual volume level permissions to the top level volume in the hierarchy comprising:
- at least one physical storage device configured to virtual storage volumes with a hierarchical structure;
- a plurality of host computers connected to the virtual storage volumes through at least one multi-protocol intelligent switch;
- a controller device, being a generic computing device that runs the applications for storage virtualization,
- for applying individual volume level permissions comprising FAULT_ON_READ, FAULT_ON_WRITE and ALLOW_IO;
- merging adjacent extents in the volume with similar permissions to provide a condensed permission for the top level volume to reduce redundancy;
- and for mapping the hierarchical permissions to the top most level of the volume graph by combining, condensing and accumulating the individual volume level permissions to the top most level, wherein said application for mapping the top most level hierarchical permission initially sets ALLOW permission as the default permission for a region of the top most level volume in the hierarchy and then rolls up the individual volume level permissions to the top level volume whenever interrupted by one of a negative permission and a hold permission in the corresponding region of one of a next and subsequent child volume in the hierarchy;
- a communication channel between the host computer(s) and virtual volumes through said at least one intelligent switch wherein all I/Os from the hosts are broken into one of a fast path I/O and a slow path I/O and depending on the volume permission as read by the switch from the mapped top level hierarchical permission the fast path I/O is one of faulted back to the storage application and allowed access to the respective physical storage as per a mapping module while generating appropriate message for the host when the access is one of denied and kept on hold: and
- a table comprising the permission map with rolled up permission of all individual volume level permission to the top most level of the hierarchical volume graph, wherein said table is embedded in a memory of said controller device to allow, hold and deny access to the host requesting the permission.

28. The network as claimed in claim 27, wherein the application for storage virtualization and for applying individual volume level permission and for condensing the hierarchical permission from the individual volumes to the top most volume level is run on the at least one intelligent switch instead of the controller device.

29. A computer program product comprising a computer readable storage medium operable to store computer program logic embodied in computer program code encoded thereon for mapping the volume level permission at individual volumes to top level volume permission in a hierarchical volume graph of a virtual storage by:
- applying volume permissions comprising FAULT_ON_READ, FAULT_ON_WRITE and ALLOW_IO, on a volume in a storage area network (SAN) within said volume graph;
- merging adjacent extents in the volume with similar permissions to provide a condensed permission for the top level volume to reduce redundancy;
- mapping the condensed permission hierarchically for the volume graph structure to the top level volume from an individual volume permission comprising:
- applying ALLOW_IO permission, as the default permission, at a region of the top level volume;
- mapping the region of the top level volume into child volumes by traversing down the volume graph; and
- rolling up the respective volume level permission to the top most level of the hierarchical volume graph, wherein the permission applied to a corresponding region of a parent volume always gets precedence over the permission applied on the same region of child in the hierarchy.

30. The method as claimed in claim 1 further comprising maintaining reference counts for each of a plurality of permissions, wherein the same permissions are set by multiple clients.

31. The method as claimed in claim 30 further comprising setting new permissions based on the reference counts.

32. The method as claimed in claim 30, wherein merging permissions for adjacent extents in the volume includes merging adjacent extents with similar reference counts.

* * * * *